US009875421B2

United States Patent
Palandro et al.

(10) Patent No.: US 9,875,421 B2
(45) Date of Patent: Jan. 23, 2018

(54) METHOD, APPARATUS AND SYSTEM FOR DETECTING THE THICKNESS OF A SUBSTANCE ON A BODY OF WATER

(71) Applicants: David A. Palandro, The Woodlands, TX (US); Timothy J. Nedwed, Houston, TX (US); Timothy A. Thornton, Tulsa, OK (US)

(72) Inventors: David A. Palandro, The Woodlands, TX (US); Timothy J. Nedwed, Houston, TX (US); Timothy A. Thornton, Tulsa, OK (US)

(73) Assignee: ExxonMobil Upstream Research Company, Spring, TX (US)

( * ) Notice: Subject to any disclaimer, the term of this patent is extended or adjusted under 35 U.S.C. 154(b) by 465 days.

(21) Appl. No.: 14/617,081

(22) Filed: Feb. 9, 2015

(65) Prior Publication Data

US 2015/0253126 A1    Sep. 10, 2015

Related U.S. Application Data

(60) Provisional application No. 61/948,447, filed on Mar. 5, 2014.

(51) Int. Cl.
*G01B 11/06*     (2006.01)
*G06K 9/46*      (2006.01)
*B63B 21/56*     (2006.01)

(52) U.S. Cl.
CPC .............. *G06K 9/46* (2013.01); *G01B 11/06* (2013.01); *B63B 21/56* (2013.01)

(58) Field of Classification Search
None
See application file for complete search history.

(56) References Cited

U.S. PATENT DOCUMENTS

| 2011/0060551 A1* | 3/2011 | Elhajj ................. G01B 7/06 702/166 |
| 2014/0357929 A1 | 12/2014 | Nedwed et al. |
| 2015/0336640 A1* | 11/2015 | Dejean .................. B63B 3/08 440/6 |
| 2016/0318041 A1* | 11/2016 | Melling ................. C02F 1/001 |

FOREIGN PATENT DOCUMENTS

WO    WO 2013/162790 A1    10/2013

* cited by examiner

*Primary Examiner* — Kevin McInnish
(74) *Attorney, Agent, or Firm* — ExxonMobil Upstream Research Company—Law Department

(57) ABSTRACT

Methods and systems described herein are useful for determining a thickness of a substance on a surface of a body of water, in particular through the use of a thickness detection apparatus that includes a body and at least one camera. The body has a plurality of sides with at least a portion of one of the sides comprising a light transmitting material. At least one camera is disposed within the body and configured to generate at least one image through the light transmitting material of the substances extending a depth below an air-substance interface.

26 Claims, 10 Drawing Sheets

METHOD, APPARATUS AND SYSTEM FOR DETECTING THE THICKNESS OF A SUBSTANCE ON A BODY OF WATER

CROSS REFERENCE TO RELATED APPLICATIONS

This application claims the benefit of U.S. Provisional No. 61/948,447, filed Mar. 5, 2014, which is incorporated herein in its entirety for all purposes.

BACKGROUND

This disclosure relates generally to the release of a substance into a body of water. Specifically, the disclosure relates to operations for managing substance releases, which utilize a thickness detection apparatus.

This section is intended to introduce various aspects of the art, which may be associated with one or more embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In the oil and gas industry, hydrocarbon substances are accessed via a wellbore to provide a fluid flow path to a processing facility. Some of these hydrocarbon resources are located under bodies of water, such as lakes, seas, bays, rivers and/or oceans, while others are located at onshore locations. To transfer hydrocarbons from such locations, a pipeline and/or one or more different vessels (e.g., ship or tanker trucks) may be utilized through various segments from the wellbore and the processing facility.

Additionally, hydrocarbons may be transferred from a production region to another region for consumption/processing into hydrocarbon-based products or from one hydrocarbon storage location to another. Transfer of hydrocarbons between such locations often requires one or more different vessels and routes over bodies of water, such as lakes, seas, bays, rivers and/or oceans.

Offshore leaks and/or spills may be problematic due to the hydrocarbon substances being released into a body of water. Typically, the hydrocarbons may form a slick on the surface of the water, for example an oil slick. Various response techniques may be utilized to manage the oil slick. For instance, chemicals may be added to the oil slick and mixed with the oil slick to break apart the hydrocarbon substances. In other situations, the oil slick may be ignited to burn off the oil within the slick or mechanical recovery may be utilized to capture the hydrocarbons.

In managing an oil slick, various factors (e.g., spatial distribution and thickness) should be considered as part of the assessment. The spatial distribution and thickness are useful in estimating the volume of hydrocarbons present in the oil slick. For example, conventional practice for marine oil spills is that 90% of the oil is located in 10% of the area as most of the slick is very thin. Determining the oil slick thickness is useful for oil spill response for many of the different response techniques. For example, mechanical recovery and in situ burning are more efficient on a thick oil slick. Also, dispersant dosage requirements change based on the slick thickness.

While the spatial distribution is typically estimated from visual inspection, conventional approaches do not adequately estimate the thickness of the oil slick. For example, conventional approaches typically utilize aircraft to determine the location of an oil slick for marine vessels. With this approach, a trained spotter or an instrument that detects an electromagnetic radiation signal from the slick is located in an airplane and in communication with response vessels. The challenge is that visual and electromagnetic radiation indicators are unable to distinguish oil thicker than about 0.1 mm.

An additional challenge is that for a large spill, each spotter is responsible for multiple response vessels, which requires the spotter in the plane to divide attention between the different response vessels. This approach has proven inefficient because identifying oil slicks from a marine response vessel combined with their dynamic nature at sea requires the spotter plane to focus on a single marine vessel until it is directly adjacent to the oil slick since it is very challenging to identify oil slicks that are more than a few tens of meters away from vessels at sea. Unfortunately, spotter planes are often unable to dedicate attention to a single vessel for the time required to efficiently guide it onto a slick. Accordingly, conventional methods fail to provide simple remote identification and effective estimation of the thickness of marine oil slicks.

WO2013/162790 describes several techniques to measure the thickness of an oil slick using an airborne detection device. The various techniques described measure the thickness of an oil slick at various distinct locations. One technique described includes lowering a camera into the oil slick to determine the thickness at the location.

However, it is desired to further enhance spill response operations by quickly and efficiently determining the areas of highest content of the released substance within a spill. For example, an oil spill may have 90% of the oil located in 10% of the area prior to substantial weathering of the spill. A desire also exists for a detection method that is capable of being stored on a vessel and that can quickly and efficiently identify the thickness of the oil slick. The ability to quickly and efficiently determine the thickest area of the released substance can improve the effectiveness of the response efforts.

SUMMARY

This summary is meant to provide an introduction of the various embodiments further described herein and is not meant to limit the scope of claimed subject matter.

In one aspect, the present disclosure relates to a method for determining a thickness of a substance on a surface of a body of water. The method includes positioning at least one thickness detection apparatus in the body of water. The thickness detection apparatus comprises a body having a plurality of sides. At least a portion of at least one of the plurality of sides comprises a light transmitting material. At least one camera is disposed within the body and configured to generate at least one image through the light transmitting material of the substance extending a depth below an air-substance interface. The method also includes analyzing at least one image from the camera to determine the thickness of the substance on the body of water.

In another aspect, the present disclosure relates to a system for responding to an oil release. The system includes a vessel, an oil thickness detection apparatus, and an oil release treatment system. The oil thickness detection apparatus comprises a body having a plurality of sides. At least a portion of at least one of the plurality of sides comprises a light transmitting material. At least one camera is disposed within the body and configured to generate at least one image through the light transmitting material of the substance extending a depth below an air-substance interface.

In yet another aspect, the present disclosure relates to a method of determining a volume of a substance released into a body of water. The method includes deploying a thickness detection apparatus to an area of interest in the body of water; determining one or more thicknesses of the substance within the area of interest; and determining the volume of the substance released based on the determined thicknesses of the substance within the area of interest. The thickness detection apparatus comprises a body having a plurality of sides. At least a portion of at least one of the plurality of sides comprises a light transmitting material. At least one camera is disposed within the body and configured to generate at least one image through the light transmitting material of the substance extending a depth below an air-substance interface.

BRIEF DESCRIPTION OF THE DRAWINGS

The foregoing and other advantages of the present disclosure may become apparent upon reviewing the following detailed description and drawings of non-limiting examples of embodiments.

Figure 1:
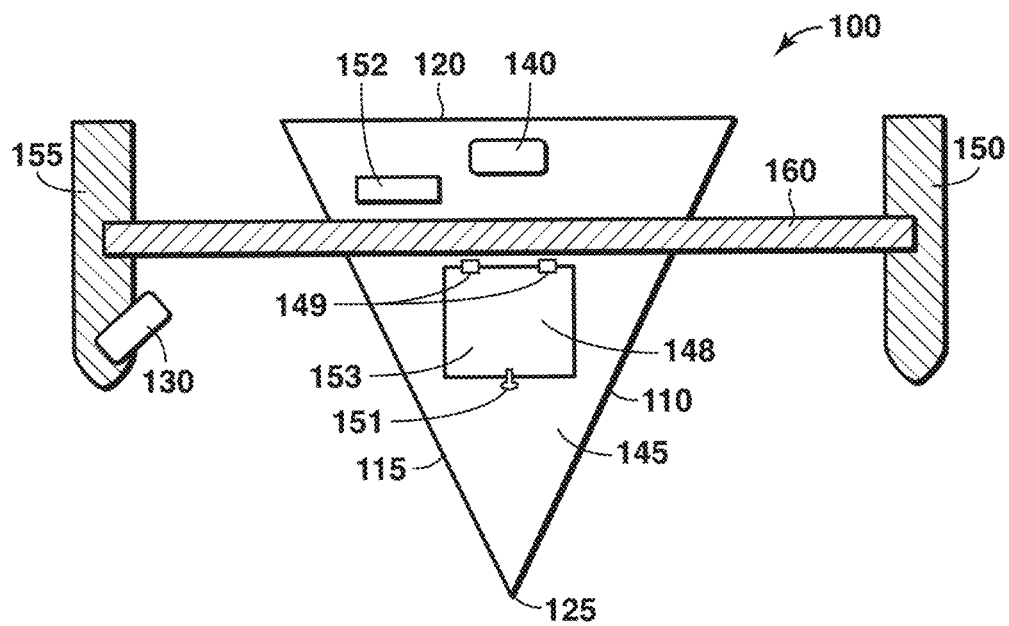
FIG. 1 is a top view illustration of a thickness detection apparatus according to one or more embodiments of the present disclosure.

It should be noted that the figures are merely examples of several embodiments of the present disclosure and no limitations on the scope of the present disclosure is intended thereby. Further, the figures are not necessarily drawn to scale, but are provided for purposes of convenience and clarity in illustrating various aspects of the present disclosure.

DETAILED DESCRIPTION

In the following detailed description section, the specific embodiments of the present disclosure are described in connection with one or more embodiments. However, to the extent that the following description is specific to a particular embodiment or a particular use of the present disclosure, this is intended to be for exemplary purposes only and simply provides a description of the one or more embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

Certain terms are used throughout the following description and claims to refer to particular features or components. As one skilled in the art would appreciate, different persons may refer to the same feature or component by different names. This document does not intend to distinguish between components or features that differ in name only. The drawing figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The term "light transmitting material" as used herein, unless indicated otherwise, is meant to include any material that is capable of transmitting light sufficient to detect an air-substance interface and/or a substance-water interface, for example a transparent material or a translucent material. In one or more embodiments, the light transmitting material may be a transparent material which is capable of transmitting at least fifty percent (50%) of light, for example at least 75% or at least 85% or at least 90%. The light transmitting material may be an organic material, inorganic material, and combinations thereof. The light transmitting material may be selected from the group consisting of glass, polymeric materials, and combinations thereof. Polymeric materials may be any suitable polymeric material capable of forming a portion of the body of the thickness detection apparatus, for example acrylic polymeric materials, polycarbonate polymeric materials and the like. Examples may include clear glass or clear polymeric materials. In one or more embodiments, the light transmitting materials may be a transparent material of an acrylic polymeric material, for example PLEXIGLAS® acrylic plastic.

The term "substance" as used herein, unless indicated otherwise, means any substance with a density less than the water in a body of water. Substances may include chemical species such as organic materials, inorganic materials, and combinations thereof. The organic materials may include petrochemical materials, petroleum materials, and combinations thereof. Petroleum materials may include hydrocarbon oils, such as crude oil, vegetable oil, mineral oil, fuel oil and combinations thereof.

Figure 2:
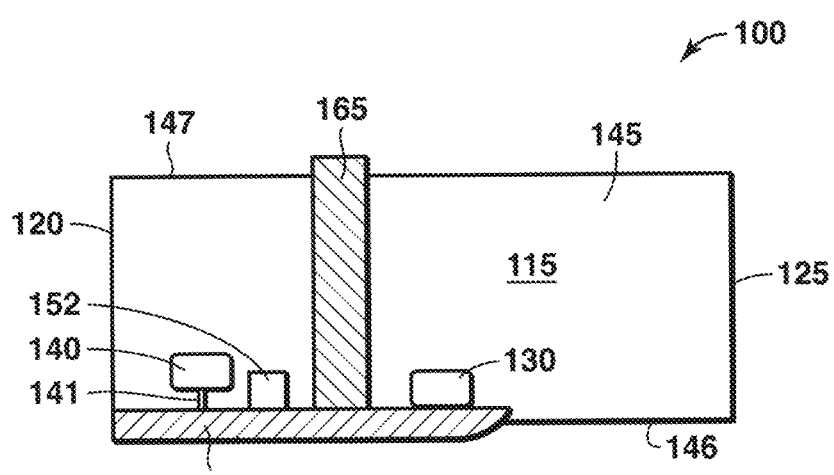
FIG. 2 is a side view of the thickness detection apparatus of FIG. 1.

FIG. 1 illustrates a top view of a thickness detection apparatus according to one or more embodiments of the present disclosure. FIG. 2 illustrates a side view of FIG. 1. The thickness detection apparatus 100 includes a body 145 having three sides (110, 115 and 120). First side 110 forms the port side of the thickness detection apparatus 100. Second side 115 forms the starboard side of the thickness detection apparatus 100. Third side 120 forms the stern of the thickness detection apparatus 100. First side 110 and second side 115 are positioned adjacent one another to form the bow 125. Bottom 146 and top 147 are joined to first side 110, second side 115, and third side 120. Any number of sides may be used in the present disclosure, at least two sides (e.g., 110, 115) having a maximum longitudinal dimension parallel to the surface of the water that may be greater than the maximum height dimension perpendicular to the surface of the water. Opening 148 may be provided in top 147 to allow access to the interior of body 145. Opening 148 includes a lid 153 connected to top 147 by two hinges 149 and held closed with latch 151. In one or more other embodiments, top 147 may be removably attached to allow access to the interior of body 145. Any suitable mechanism may be used to removably attach the top to the body 145. In one or more embodiments, the opening within the top or the sides adjacent the top may be provided with a seal to reduce intrusion of water and/or substance into the interior of the body of the thickness detection apparatus. Bottom 146, top 147, first side 110, second side 115 and third side 120 are depicted in FIGS. 1 and 2 as completely made (substantially 100%) of a light transmitting material. In one or more other embodiments, the light transmitting material may form only a portion of the body 145 and the remaining portions of the body 145 may be made of any suitable material used in a marine environment, for example metals, polymeric materials, fiberglass and the like. Bottom 146, top 147 and sides 110, 115, and 120 are joined using a suitable, water-resistant glue or adhesive. An additional sealant may be provided for sealing the interface between the top, bottom and sides. The additional sealant may be chosen based on the material used to form the body 145. In one or more other embodiments, the bottom 146, sides 110, 115, and 120 and optionally top 147 may be formed of a single, integral piece.

Still referring to FIGS. 1 and 2, a stability enhancing system is provided for thickness detection apparatus 100. The stability enhancing system includes horizontal support 160, vertical supports 165 (only one of which is shown) and skis 150 and 155 positioned on the port and starboard side respectively. The vertical supports of the stability enhancing system operatively connect the horizontal support to the respective ski. The horizontal support may be operatively connected to the body 145 by any suitable mechanism (e.g., a mechanical attachment such as screws, bolts, adhesive, etc.). The skis may be of any suitable size, shape, geometry, and material sufficient to provide stability to the body of the thickness detection apparatus during operation and help maintain the body at an appropriate depth in the body of water. The horizontal and vertical supports of the stability enhancing system may be of any suitable size, shape, geometry and material.

Still referring to FIGS. 1 and 2, thickness detection camera 140 is disposed within body 145 and positioned such that an image can be obtained of a substance extending a depth below an air-substance interface when the substance is present. For example, camera 140 may be disposed such that an image can be obtained of the air-substance-water interfaces. Camera 140 may be operatively connected to mount 141. The mount may be fixed or configured to provide at least three degrees of freedom, for example moving the camera in the z-direction to adjust the height and in the x,y directions to circumferentially rotate the camera and to adjust the angle of the camera. By providing a body of substantially greater size compared to the camera, the stability of the camera is improved. The volume of the body of the thickness detection apparatus may be at least two times the volume of the thickness detection camera, for example at least 5 times, at least 10 times, or at least 20 times or more, same basis. The stability of the thickness detection camera may be further enhanced by utilizing a stability enhancing system.

An additional camera 130 is disposed on the forward portion of the starboard side ski 155. Although not shown, the additional camera 130 may be disposed on the ski using a mount similar to mount 141. The additional camera(s) may be disposed exterior to the body of the thickness detection apparatus to provide visual observations of the presence of the substance, the behavior of the substance as the thickness detection apparatus moves through the body of water and/or sea-state conditions of the marine environment in the area of interest. The additional camera(s) disposed exterior the body of the thickness detection apparatus may be positioned such that the water and any substance present does not obscure the lens of the camera and the presence and/or the behavior of the substance may be observed.

The interior of body 145 also includes a global positioning system (GPS) 152. GPS 152 may be configured to transmit signals of the location of the thickness detection apparatus to a command unit. In one or more other embodiments, the GPS may be located on the exterior of the body 145 or on an associated deployment device. The locations of the thickness detection apparatus may then be correlated to the images or video generated by camera 140 for the determination of the location of the thickest portions or other operationally retrievable amounts of the substance within an area of interest. As used herein unless indicated otherwise, it is understood that a "video" comprises a series or sequence of images.

In one or more embodiments, the thickness detection camera may be any camera capable of generating an image through the light transmitting material with sufficient resolution to detect a substance extending a depth beneath the air-substance interface, for example sufficient resolution to detect the air-substance and the substance-water interfaces (air-substance-water interfaces). The thickness detection camera may be a high definition camera. In one or more embodiments, the thickness detection camera may be capable of generating a video in real-time of a substance on the body of water. In one or more embodiments, the thickness detection camera may be configured to transmit signals of one or more images or video to a command unit.

In one or more embodiments, the one or more additional cameras may be any camera capable of generating an image of the substance external to the body of the thickness detection apparatus. In one or more embodiments, at least one additional camera may be a high definition camera with sufficient resolution to observe the behavior of a substance as the thickness detection apparatus moves through the body of water. In one or more embodiments, at least one additional camera may be an infrared camera for detecting the presence of the substance on the body of water. In one or more embodiments, the one or more additional cameras may be capable of generating a video in real-time of the behavior of the substance. In one or more embodiments, the one or more additional cameras may be configured to transmit signals of the one or more images or video to a command unit.

Figure 4:
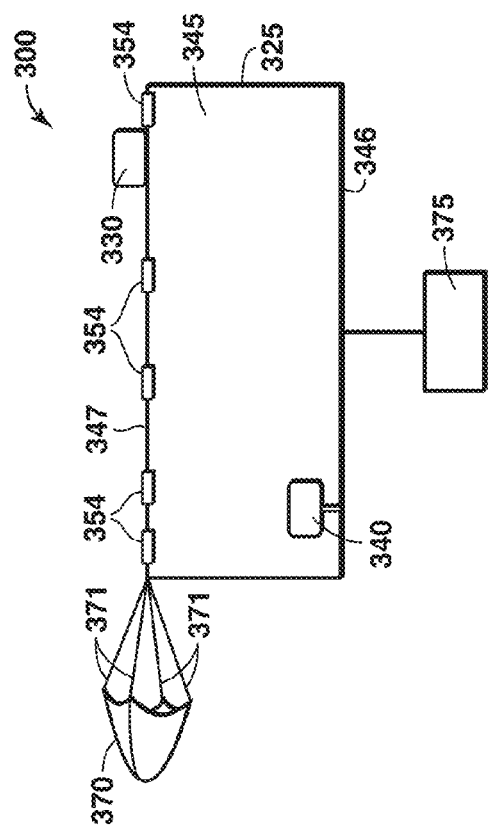
FIG. 4 is a side view of the thickness detection apparatus of FIG. 3.
Figure 3:
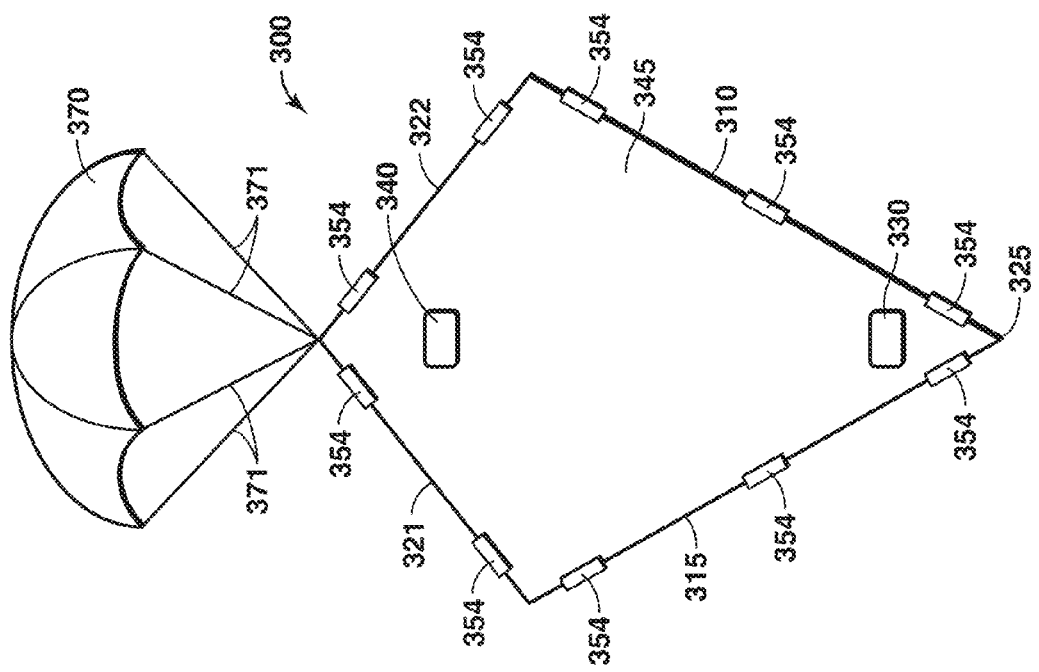
FIG. 3 is a top view illustration of a thickness detection apparatus according to one or more embodiments of the present disclosure.

FIG. 3 illustrates a top view of a thickness detection apparatus according to one or more embodiments of the present disclosure. FIG. 4 illustrates a side view of FIG. 3. The thickness detection apparatus 300 includes a body 345 having four sides (310, 315, 321 and 322). First side 310 forms a major portion of the port side of the thickness detection apparatus 300. Second side 315 forms a major portion of the starboard side of the thickness detection apparatus 300. Third side 321 and fourth side 322 form the stern of the thickness detection apparatus 300. First side 310 and second side 315 are positioned adjacent one another to form the bow 325. Bottom 346 and top 347 are joined to first side 310, second side 315, third side 321, and fourth side 322. Top 347 is removably attached to sides 310, 315, 321, and 322 using latches 354. The sides and bottom may be attached as discussed herein with respect to FIGS. 1 and 2. Bottom 346, top 347, first side 310, second side 315, third side 321, and fourth side 322 are depicted in FIGS. 3 and 4 as made completely (substantially 100%) of a light transmitting material.

Still referring to FIGS. 3 and 4, a stability enhancing system is provided for thickness detection apparatus 300. The stability enhancing system includes a drogue 370 attached to the body 345 using lines 371. The drogue may be any suitable drogue configured to provide stability to the thickness detection apparatus and keep the bow pointing forward by slowing the stern of the body 345. The stability enhancing system also includes weight 375. Weight 375 may be of any suitable size, shape, geometry and material capable of controlling the buoyancy of the body 345 such that the body 345 maintains a substantially constant depth in the body of water. In one more other embodiments, the weight may be integral with the bottom of the thickness detection apparatus. Similar to FIGS. 1 and 2, thickness detection camera 340 is disposed within body 345 and additional camera 330 is disposed on an external surface of the body 345, in particular top 347. In one or more other embodiments, any other suitable stability enhancing system may be used.

Figure 5:
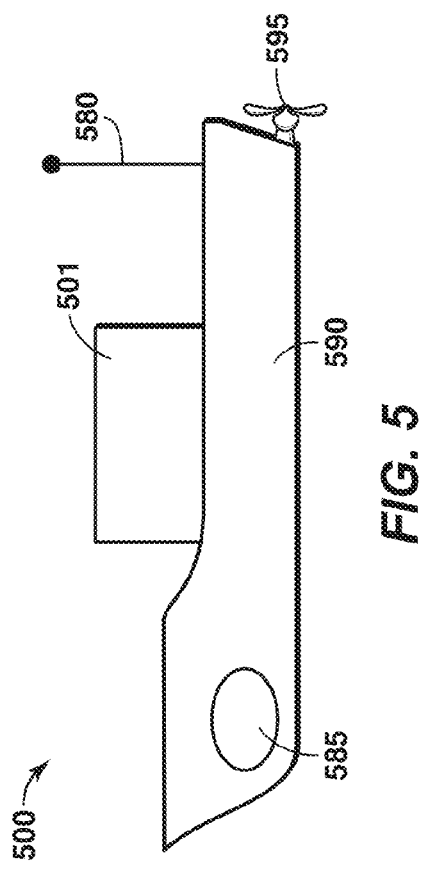
FIG. 5 is a side view illustration of a thickness detection apparatus according to one or more embodiments of the present disclosure.

FIG. 5 is an illustration of a thickness detection apparatus according to one or more embodiments of the present disclosure. In FIG. 5, thickness detection apparatus 500 includes waterborne device 501 which is an autonomous boat. Waterborne device 501 has a hull 590 and a propulsion system 595. The propulsion system 595 may include one or more propulsion components configured to maneuver the waterborne device, for example propellers, impellers and/or jet thrusters. The one or more propellers and/or impellers may be included in screw-type propeller systems, azimuth thrusters or the like. Hull 590 includes a portal of light transmitting material 585 positioned in the forward section of the hull. Thickness detection apparatus 500 includes communication component 580 configured to transmit signals of GPS position data and images/video. The communication component may be used with any embodiments for the thickness detection apparatus. In one or more other embodiments, a plurality of portals or a major portion of the hull extending downward from a height above the air-substance interface may comprise the light transmitting material providing a wider range of views for the thickness detection camera.

Figure 6:
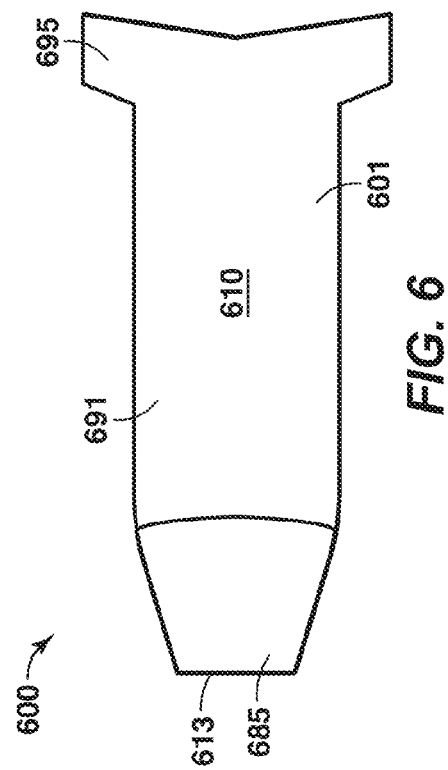
FIG. 6 is a side view illustration of a thickness detection apparatus according to one or more embodiments of the present disclosure.

FIG. 6 is an illustration of a thickness detection apparatus according to one or more embodiments of the present disclosure. In FIG. 6, thickness detection apparatus 600 includes waterborne device 601 which is an underwater vehicle. Waterborne device 601 has body 691 and a propulsion system 695. Body 691 includes a portal of light transmitting material 685 positioned in the forward section of body 691. Body 691 includes a plurality of sides including side 610 and 613 and may be positioned in the body of water such that the air-substance interface and substance-water interface are visible to the thickness detection camera (not shown).

The body of the thickness detection apparatus according to the various embodiments of the present disclosure allows the thickness detection apparatus to move through the body of water, whether self-propelled or propelled via a deployment device, providing the ability to generate images and/or video in a continuous or semi-continuous manner. Such an ability increases the speed and efficiency of determining the thickest regions or other operationally retrievable amounts of the released substance leading to an improvement in the effectiveness of the response efforts.

The present disclosure also relates to a system for deploying a thickness detection apparatus. In one or more embodiments, the deployment system may include a deployment device and a thickness detection apparatus operatively connected to the deployment device. The deployment device may be selected from an airborne device, a waterborne device and combinations thereof. In one or more embodiments, the airborne device may include a manned aircraft or an unmanned (autonomous) aircraft, for example a winged airplane, a helicopter or a dirigible. In one or more embodiments, the waterborne device may include a boat, a ship, a vessel, an underwater vehicle, and the like. The waterborne device may be manned or unmanned (autonomous). In one or more embodiments, the unmanned airborne device or unmanned waterborne device are of a size capable of deploying a thickness detection apparatus and may be significantly smaller in scale than a manned airborne device or a manned waterborne device.

In one or more embodiments, the deployment device may be used to position the thickness detection apparatus in the body of water. The deployment device may be operatively connected to the thickness detection apparatus using a tether line. The tether line may be retractable. The tether line may be releasably attached to the deployment device, the thickness detection apparatus and a combination thereof. In one or more other embodiments, the thickness detection apparatus may be provided with a propulsion system which may be used in combination with a deployment device or may be utilized without a deployment device.

Figure 7:
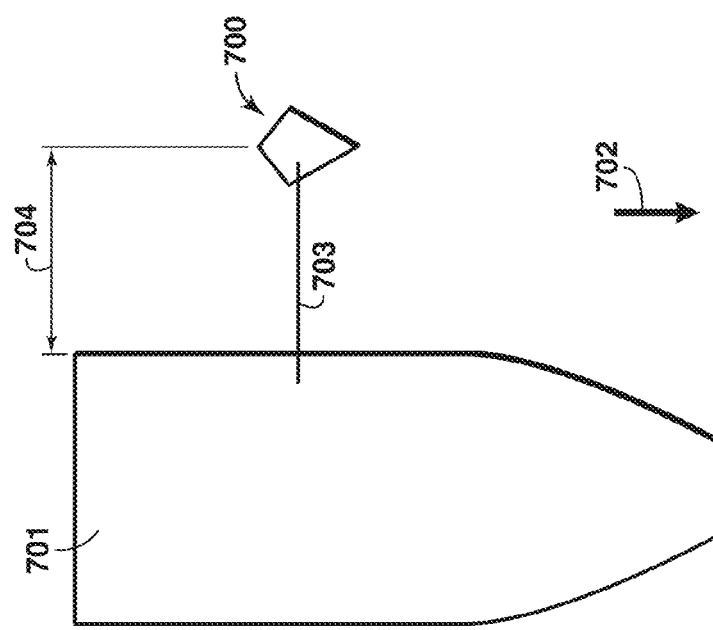
FIG. 7 is a top view illustration of a thickness detection apparatus deployed from a vessel according to one or more embodiments of the present disclosure.

FIG. 7 is a top view illustration of an oil response system including a thickness detection apparatus deployed from a vessel according to one or more embodiments of the present disclosure. Vessel 701 is a response vessel and also acts as a deployment device. Vessel 701 is depicted as traveling in the direction of arrow 702. The deployment device also includes an arm 703 extending from vessel 701. Arm 703 extends from the side of vessel 701 to the thickness detection apparatus 700 such that distance 704 is substantially outside the wake created by vessel 701 when moving through the body of water.

Figure 8:
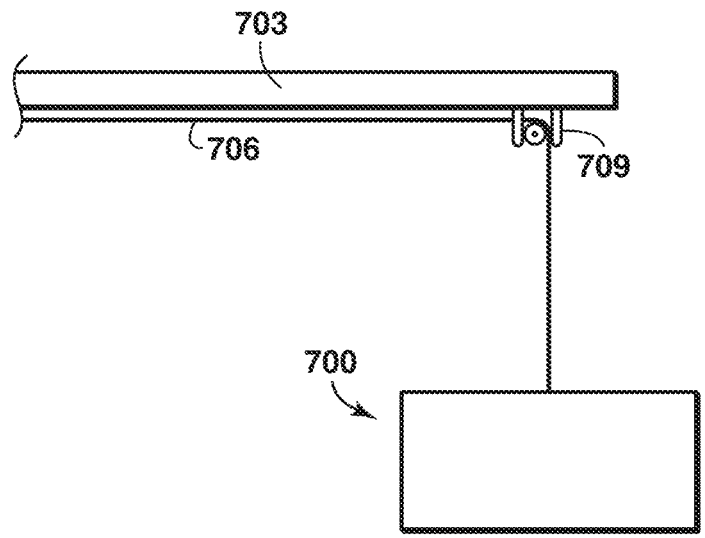
FIG. 8 is partial view of the thickness detection apparatus of FIG. 7.

FIG. 8 is a partial rear view of arm 703. Tethering line 706 extends along the arm 703 through pulley 709 to thickness detection apparatus 700. The opposite end of tether line 706 extends to a winch (not shown) to retract or lower thickness detection apparatus 700.

Figure 9:
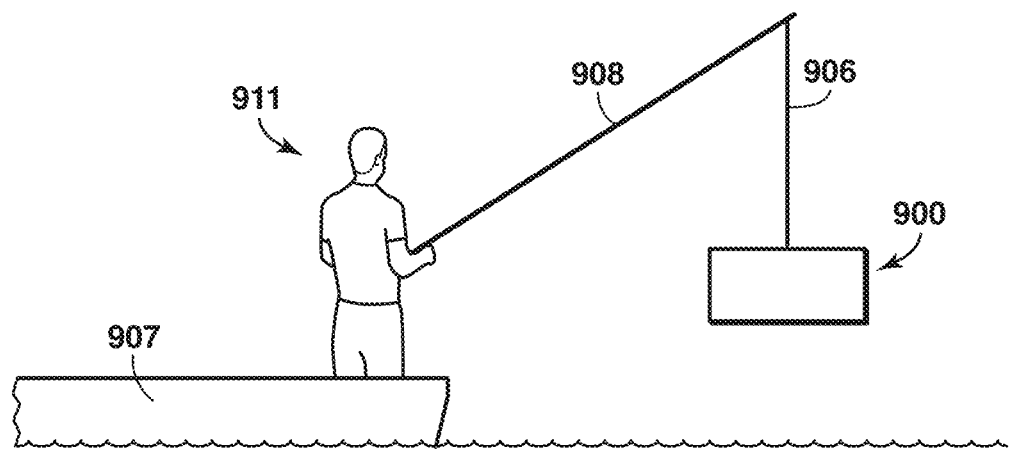
FIG. 9 is an illustration of a thickness detection apparatus deployed from a boat according to one or more embodiments of the present disclosure.

FIG. 9 is an illustration of a deployment device according to one or more embodiments of the present disclosure. The deployment device includes a pole mount 908 with tethering line 906 operatively connected to thickness detection apparatus 900. Pole mount 908 is maneuvered by human operator 911 from boat 907 traveling through the body of water 958.

Figure 10:
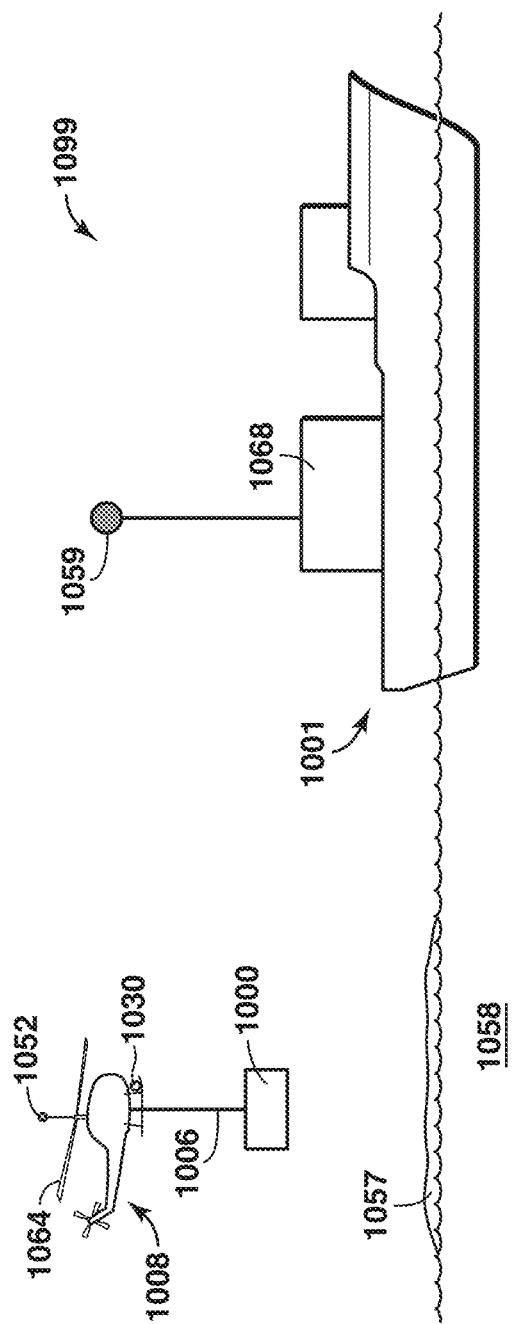
FIG. 10 is an illustration of the deployment of a thickness detection apparatus according to one or more embodiments of the present disclosure.
Figure 11:
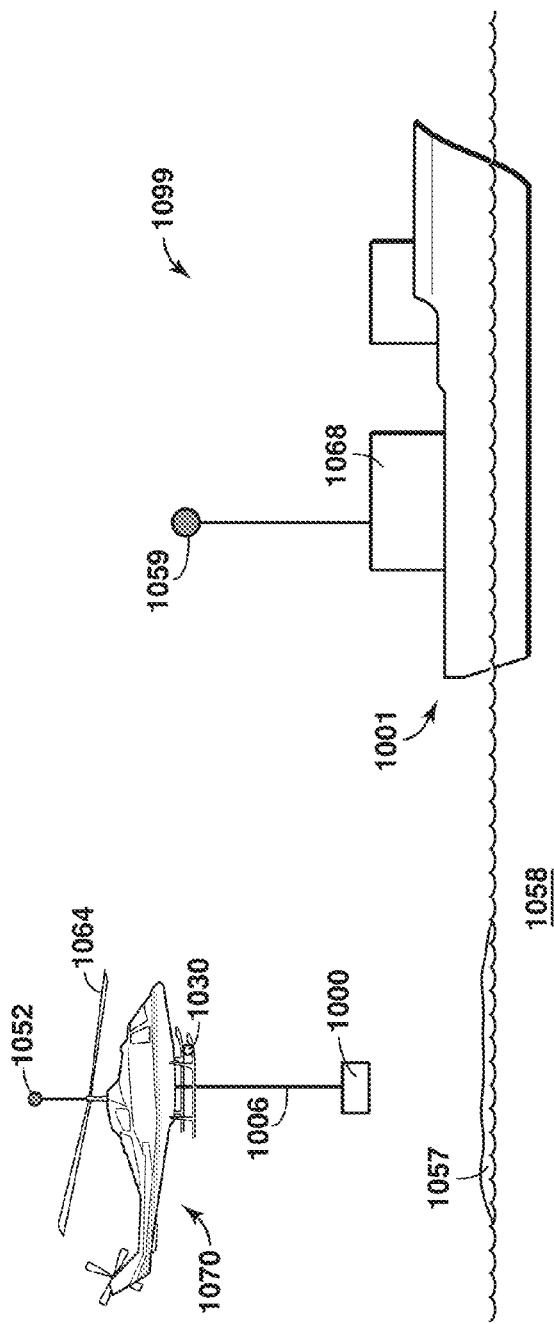
FIG. 11 is an illustration of the deployment of a thickness detection apparatus according to one or more embodiments of the present disclosure.

FIG. 10 is an illustration of a substance release response management system 1099 according to one or more embodiments of the present disclosure. Vessel 1001 is a response vessel equipped with one or more substance release treatment systems (not shown). Vessel 1001 may be deployed near a substance release 1057 on a body of water 1058. Vessel 1001 also contains deployment device 1008. Deployment device 1008 is an unmanned, remote controlled helicopter equipped with communication component 1052 and additional camera 1030. Tether line 1006 operatively connects thickness detection apparatus 1000 to deployment device 1008. Deployment device 1008 has a propulsion system 1064 and is configured to move thickness detection apparatus 1000 through substance 1057 on the body of water 1058 to traverse an area of interest of the release and determine regions of thickest substance 1057 for strategic deployment of a substance release treatment technique. Propulsion systems for an airborne deployment device may include one or more propulsion components configured to maneuver the airborne device, for example a rotor, a wing and the like. FIG. 11 illustrates a similar substance response system utilizing a manned helicopter 1070.

The substance release management system 1099 may include one or more deployment devices, such as unmanned, remote controlled helicopter 1008, which are in communication with a command unit 1068 via associated antenna 1059, which is shown disposed on vessel 1001. The thickness detection apparatus may be deployed from vessel 1001 via deployment device 1008 to determine the spatial distribution of a substance release 1057 and/or to determine the thickness of the release 1057 at various locations. In one or more embodiments, the thickness may be determined in a continuous manner by generating video images in real time or a semi-continuous manner by generating a plurality of sequential images with the thickness detection camera as the thickness detection apparatus moves through the body of water in an area of interest. In one or more other embodiments, the thickness may be determined in a discontinuous manner by generating images with the thickness detection camera for various discrete locations within an area of interest. In one or more embodiments, the images or video may be generated using a combination of continuous, semi-continuous and discontinuous techniques.

In one or more embodiments, one or more lights may be used to allow dusk, dawn and/or nighttime operations. One or more lights may be disposed on the exterior and/or interior of the thickness detection apparatus and/or on the exterior and/or interior of an associated deployment device. The one or more lights may be operatively connected to a power component via a power line and/or a communication component via a communication line in the associated apparatus or device.

Still referring to FIG. 10, the communication component 1052 of deployment device 1008 is configured to communicate with the command unit 1068. The communication component 1052 and/or the command unit 1068 may be configured to calculate the thickness of the substance. Power components (not shown) may be used to power components or modules of the deployment device and the thickness detection apparatus, for example a motor, a battery and/or solar powered equipment. The different components or modules may be powered from a common power component or from separate power sources for each of the respective components or modules. In one or more embodiments, the different components and modules may also utilize a separate power source as a redundant power supply.

In one or more embodiments, the communication components include antenna 1052. Communication equipment may be utilized with one or more other communication components to communicate with one or more other deployment devices, thickness detection apparatuses, internal components or modules within a deployment device or thickness detection apparatus, and/or the command unit 1068. The communication equipment may utilize technologies, such as radio, cellular, wireless, microwave or satellite communication hardware and software. Also, the communication equipment may include and utilize any of a variety of known protocols to manage the exchange of information (e.g., Ethernet, TCP/IP, and the like). The communication equipment utilized may depend on the specific deployment locations and configuration. For example, if two or more deployment devices and/or thickness detection apparatuses are located in close proximity to each other, one device may include satellite communication equipment along with radio or wireless communication equipment, while the other devices may include only radio or wireless communication equipment. In this manner, the device or apparatus with the satellite communication equipment may handle communication to the command unit for the other devices or apparatuses. Although depicted in the figures with the command unit on a vessel, in other embodiments the command unit may be located on land, offshore platform or any other remote locations.

In one or more embodiments, the vessel may be a response vessel or a vessel of opportunity. Each vessel may include one or more thickness detection apparatuses and depending on the propulsion systems utilized one or more associated deployment devices. The deployment device or thickness detection apparatus, depending on the mode of propulsion to move the thickness detection apparatus through the body of water, may be manually controlled by an operator or may be computer controlled (automated) or combinations thereof. Further, the deployment device and thickness detection apparatus may also include communication components to enhance operation of the system.

Figure 12:
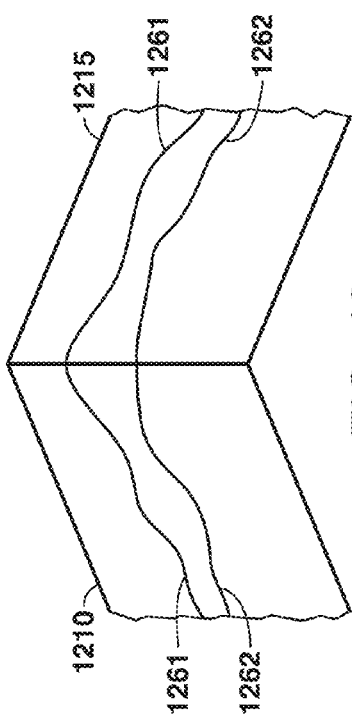
FIG. 12 is an illustration of an image observed from a thickness detection apparatus while moving through a body of water.

FIG. 12 is an illustration of an image observed from a thickness detection apparatus while moving through a body of water. Air-substance interface 1261 and substance-water interface 1262 are visible through the light transmitting material of sides 1210 and 1215 of the body of the thickness detection apparatus.

Figure 13:
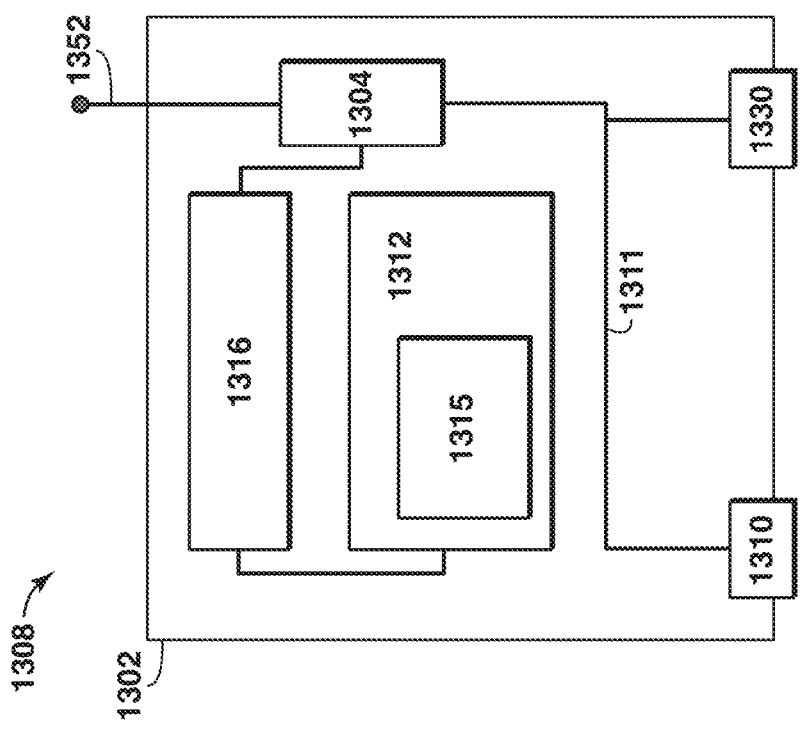
FIG. 13 is a schematic of the internal components of the deployment device of FIG. 10.

FIG. 13 is an illustration of the internal components of the deployment device 1008 of FIG. 10. Deployment device 1308 includes housing 1302 that encloses one or more of a communication component 1304 and associated antenna 1352, an additional high definition (HD) camera 1330, an additional infrared (IR) camera 1310, a power component 1312 and propulsion component 1316. The modules and components are provided power from the power component 1312 via power distribution lines (not shown). Similarly, the different modules and components may communicate with each other via communication lines 1311. The system of FIG. 13 utilizes central power and communication lines to manage the operation in an efficient manner.

In operation, the power component 1312 may be utilized to supply power to the propulsion component 1316. Further, the power component 1312 may provide power to the communication component 1304, the high definition (HD) camera 1330, and the infrared (IR) camera 1310. In this embodiment, the power component 1312 includes batteries 1315 and a motor (not shown). The batteries 1315 may provide power via the power distribution lines, which may include one or more cables, as an example. The motor may turn fuel into power, which may be used to power the modules and components and also to recharge the batteries 1315.

Still referring to FIG. 13, the communication component 1304 is utilized to exchange information between the different modules and components and/or the command unit via the communication lines 1311 and the communication antenna 1352. The communication component 1304 may utilize the communication lines 1311 to handle the exchange of information, such as data, status indications or other notifications, between the modules, such as the high definition (HD) camera 1330, the infrared (IR) camera 1310, the power component 1312 and the propulsion component 1316. The communication lines 1311 may include a bus, Ethernet cable, fiber optics or other suitable physical connection. In an alternative embodiment, the communication between modules may be via a wireless connection. Similarly, the communication protocol may be any protocol known to those skilled in the art.

Figure 14:
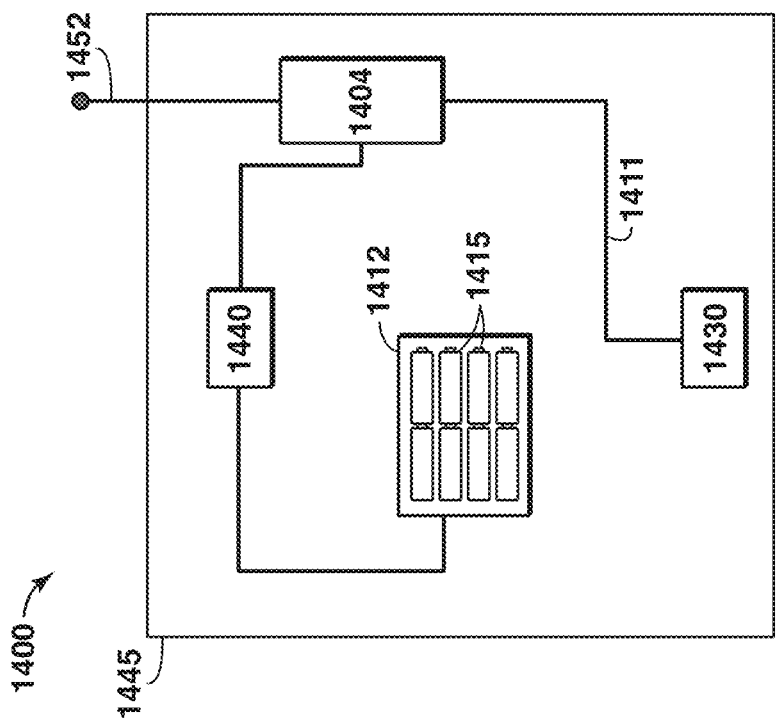
FIG. 14 is a schematic of the internal components of a thickness detection apparatus according to one or more embodiments of the present disclosure.

FIG. 14 is an illustration of the internal components of a thickness detection apparatus according to one or more embodiments of the present disclosure. The body 1445 of the thickness detection apparatus 1400 encloses one or more of a communication component 1404 and associated antenna 1452, a thickness detection high definition (HD) camera 1440, an additional high definition (HD) camera 1430, and a power component 1412. To monitor the substance release, the thickness detection high definition (HD) camera 1440 and the additional high definition (HD) camera 1430 may be utilized to determine spatial distribution and/or thickness of the substance release, e.g., oil slick. The modules and components are provided power from the power component 1412 via power distribution lines (not shown). Similarly, the different modules and components may communicate with each other via communication lines 1411. The system of FIG. 14 utilizes central power and communication lines to manage the operation in an efficient manner.

In operation, the power component 1412 may be utilized to supply power to the communication component 1404, the high definition (HD) camera 1440, and the additional high definition (HD) camera 1430. In this embodiment, the power component 1412 includes batteries 1415. Although the power component 1412 is depicted as including batteries 1415, any other suitable power components may be utilized. The batteries 1415 may provide power via the power distribution lines (not shown), which may include one or more cables, as an example. In one or more other embodiments, power may be supplied to the thickness detection apparatus from one or more power components on an associated deployment device.

Still referring to FIG. 14, the communication component 1404 is utilized to exchange information between the different modules and components and/or the command unit via the communication lines 1411 and the communication antenna 1452. The communication component 1404 may utilize the communication lines 1411 to handle the exchange of information, such as data, status indications or other notifications, between the modules, such as the high definition (HD) camera 1440, the additional high definition (HD) camera 1430, and the power component 1412. The communication lines 1411 may include a bus, Ethernet cable, fiber optics or other suitable physical connection. In an alternative embodiment, the communication between modules may be via a wireless connection. Similarly, the communication protocol may be any protocol known to those skilled in the art.

In one or more other embodiments, the thickness detection apparatus may include its own propulsion system. In such embodiments, the internal components of the thickness detection apparatus include a propulsion system. The power component may additionally include a motor in addition to batteries to power the internal components, as described herein with respect to the deployment device.

Referring back to FIGS. 10 and 11, the command unit 1068 may be utilized as a central location to manage one or more other devices and/or apparatuses. The command unit 1068 may include power components, communication components and/or management components. The command unit 1068 may be disposed on a vessel 1001, such as a response vessel or a vessel of opportunity, to facilitate communication and interaction with other devices and apparatuses. However, in one or more other embodiments, the command unit 1068 may be located at an onshore location, an offshore platform, or any other remote locations.

Similar to the deployment device and thickness detection apparatus, the power components may include a battery and/or solar powered equipment. Further, the power components for the command unit 1068 may also include one or more motors such as turbines and/or engines. That is, the command unit 1068 may be disposed on a vessel, which may include motors that supply power to equipment on the vessel.

The communication components of the command unit may include communication equipment that is utilized with one or more antennae 1059 to communicate with one or more deployment devices, thickness detection apparatuses and other operation centers. The communication equipment may utilize technologies, such as radio, cellular, wireless, microwave or satellite communication hardware and software. Also, the command unit may utilize Ethernet communications, such as local area networks or wide area networks.

The management components may include different modules, which may include hardware, sets of instructions stored in memory and configured to be accessed by a processor to execute the set of instructions, or a combination of both. These modules may include display and imaging modules that present the images or visible indications to an operator, and modules configured to determine the thickness of the substance, for example an oil slick. Persons skilled in the technical field will readily recognize that in practical applications of the disclosed methodology, it is at least partially performed on a computer, typically a suitably programmed digital computer. Further, some portions of the detailed description herein are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the discussions herein, it is appreciated that throughout the present disclosure, discussions utilizing the terms such as "processing" or "computing", "calculating", "determining", "displaying", "copying," "producing," "storing," "adding," "applying," "executing," "maintaining," "updating," "creating," "constructing" "generating" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more embodiments of the present disclosure also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the present disclosure can be implemented as software, hardware, firmware or any combination thereof. Of course, wherever a component of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present disclosure is in no way limited to implementation in any specific operating system or environment.

Further, one or more embodiments may include methods that are performed by executing one or more sets of instructions to perform modeling enhancements in various stages. For example, the method may include executing one or more sets of instructions to perform comparisons between transmitted data from the modules and/or components of the thickness detection apparatus and optionally a deployment device.

As an example, a computer system may be utilized and configured to implement on or more embodiments of the present disclosure. The computer system may include a processor; memory in communication with the processor; and a set of instructions stored on the memory and accessible by the processor, wherein the set of instructions, when executed, are configured to: receive the transmitted signal from a deployment device and/or a thickness detection apparatus; determine the thickness of the substance based on the transmitted signal; and provide a visible indication of the thickness of the substance based on the determination.

In one or more embodiments, the thickness detection apparatus transmits a signal to the command unit, the command unit receives the signal and extracts a thickness determination from the image signal and displays the thickness determination on a monitor. In one or more embodiments, a hydrocarbon release management system comprises a command unit; one or more thickness detection apparatuses directly or indirectly in communication with the command unit and optionally one or more deployment devices also directly or indirectly in communication with the command unit. One or both of the thickness detection apparatus and deployment device may include a propulsion system having one or more propulsion components, as discuss herein. The thickness detection apparatus and deployment apparatus may each include a communication component configured to communicate signals directly or indirectly to the command unit. In one or more embodiments, the communication component may be configured to transmit to the command unit via hardware selected from wireless communication hardware, cellular communication hardware and combinations thereof. The thickness detection apparatus also includes a detection component configured to generate one or more images or video of the substance from the thickness detection camera and any additional cameras. The detection component may additionally be configured to determine the thickness of the substance from the images or video from the thickness detection camera. In one or more embodiments, one or more propulsion components of the propulsion system may be configured to be controlled via remote control communications.

In one or more embodiments, the determination of the thickness of the substance based on the transmitted signal may comprise a set of instructions, when executed, configured to: display an image or real time video generated by the thickness detection camera on a monitor to visually determine the relative thickness of the substance based on comparing a plurality of images from the thickness detection camera. The image comparison may be performed by an operator or computer and regions of thickest substance or other operationally retrievable amounts of the substance input into the computer system. In one or more embodiments, a reference length may be provided in the images or video to provide greater accuracy in determining the thickness of the substance in the images or video. The reference length may be provided on the light transmitting material within the field of view of the camera or computer generated based on the settings of the camera. The reference length may have one or more demarcations, for example the demarcations may be every 0.5 millimeter (mm), or 1 mm or 2 mm. In one or more embodiments, an operator may view real-time video images generated from the thickness detection apparatus and determine relative thicknesses between regions being surveyed in the area of interest. The data may be input and stored in a computer system. The data may be displayed to the operator on a digital display, for example in the format of a dashboard. In other embodiments, the dashboard may be in a non-electronic form. The dashboard may also include one or more predetermined paths to be traversed by a thickness detection device. In one or more embodiments, the positioning of the thickness detection apparatus may be displayed concurrently with the real-time video images and configured such that the operator may mark or otherwise input into the dashboard the relative thicknesses for various regions being surveyed. The regions of thickest substance or other operationally retrievable amounts of the substance may be identified for the deployment of a response team. If more than one thickness detection apparatuses are utilized, additional operators may be provided for each of the additional apparatuses.

In one or more other embodiments, the determination of the thickness of the substance may comprise a set of instructions, when executed, configured to: apply one or more algorithms to discretely generated images or images from video generated from a thickness detection camera to determine the thickness of the substance in the image. In one or more embodiments, the set of instructions may additionally be configured to compare thicknesses of different locations from a plurality of images and provide the regions of thickest substance or other operationally retrievable amounts of the substance and the associated locations. The thickness determinations of the algorithm may be qualitative or quantitative.

In one or more embodiments, the command unit may include a set of instructions stored on the memory and accessible by the processor, wherein the set of instructions, when executed, are configured to provide one or more of a visual indication and audible notification associated with the thicker amounts of the substance. The visible and/or audible notification may be based on a predetermined thickness threshold value. In one or more embodiments, the command unit may also include a set of instructions stored on the memory and accessible by the processor, wherein the set of instructions, when executed, are configured to store the thickness of the substance at the specific location.

Figure 15:
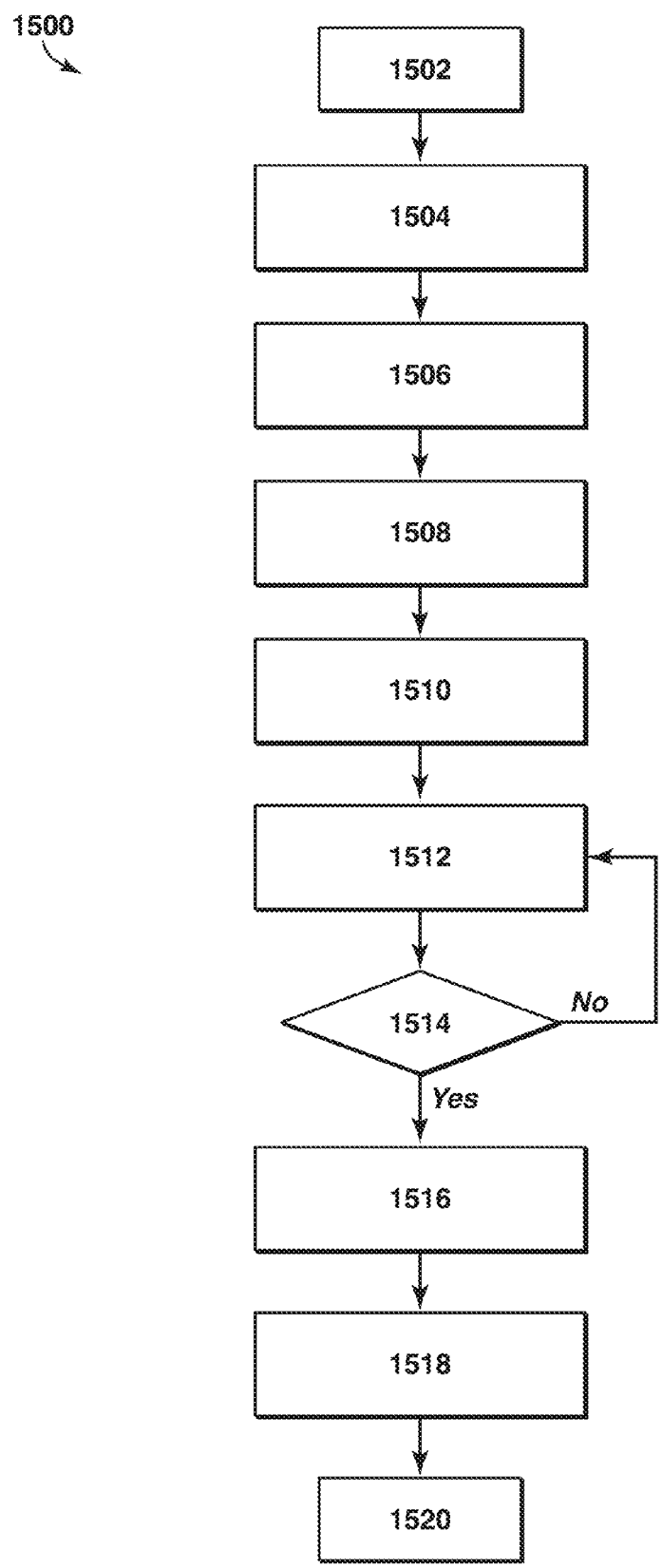
FIG. 15 is a flow chart for performing substance release management according to one or more embodiments of the present disclosure.

FIG. 15 is a flow chart 1500 for performing substance release management according to one or more embodiments of the present disclosure. This flow chart 1500 includes a preparation and deployment stage, which includes blocks 1502, 1504, 1506 and 1508, followed by a detection and determination stage, which includes blocks 1510, 1512, 1514 and 1516, and followed by a response stage, which includes blocks 1518 and 1520.

The process begins with the preparation and deployment stage, which prepares the equipment and deploys the equipment to the release location. The process begins at block 1502. At block 1504, the ship with one or more thickness detection apparatuses and optionally one or more deployment devices is deployed. The deployment of the ship may include fueling the ship, loading the one or more thickness detection apparatuses and optional deployment devices onto the ship and moving the ship from port. The deployment may also include selecting the thickness detection apparatuses and deployment devices to be utilized. In one or more embodiments, a plurality of thickness detection devices may be used. The plurality of thickness detection apparatuses may be of the same or similar design or substantially different designs. Different designs may be useful for different regions within an area of interest. For example, one or more short range thickness detection apparatuses with propulsion systems incorporated therein (self-propelled) or one or more deployment devices with short range propulsion capabilities may be used in combination with one or more medium to long range self-propelled thickness detection apparatuses or one or more medium to long range deployment devices. Using a plurality of thickness detection apparatuses can reduce the time to acquire thickness information and enhance the amount of thickness information obtained. Additional thickness detection apparatuses may also provide redundancy in equipment in the event of equipment malfunction.

Prior to or once the ship is deployed, the release may be located, as shown at block 1506. Locating the release may include aerial reconnaissance (airborne devices or satellites) or identification from marine vessels, offshore platforms or other suitable means. The ship is then deployed to a location near the release, as shown at block 1508. This location may be communicated to the ship in any suitable manner. The deployment of the ship may include transporting the one or more thickness detection apparatuses and optional one or more deployment devices to a location near that indicated in the communication.

After the preparation and deployment stage, the monitoring and operation stage is performed, as noted at blocks 1510, 1512, 1514 and 1516. At block 1510, the one or more thickness detection apparatuses are deployed. In one or more embodiments, the one or more thickness detection apparatuses may be equipped with one or more additional cameras and may be deployed to determine a perimeter location and spatial distribution of the release. In some embodiments, the one or more thickness detection apparatuses may concurrently determine the thickness of the substance while determining a perimeter location or spatial distribution. In one or more other embodiments, one or more deployment devices equipped with one or more additional cameras may be deployed to determine a perimeter location and spatial distribution of the release. In one or more embodiments, a perimeter location and spatial determination of the release may be performed with the one or more deployment devices with or without the associated thickness detection device (e.g., manned or unmanned airborne device, waterborne device or combinations thereof). The one or more thickness detection apparatuses may determine the thickness of the substance in an area of interest either simultaneously with or subsequent to perimeter location or spatial distribution determinations. As discussed herein, the thickness detection apparatuses may be deployed from the ship and may be self-propelled via a propulsion system contained therein or may be propelled through the body of water via a deployment device. This involves controlling the thickness detection apparatus or deployment device to move the thickness detection apparatus through various locations of the substance on the body of water.

At block 1512, the thickness of the substance in an area of interest is determined, as discussed herein. The thickness may be determined for a single location in the area of interest or may be determined for a plurality of locations in a continuous, semi-continuous and/or discontinuous manner. The thickness detection apparatus or deployment device may be configured to transmit information within a set time window (e.g., every 10 seconds, 60 seconds, 5 minutes, or even 10 minutes), transmit information when polled by the command unit, or transmit information in a continuous manner as the images or video are collected. When using an airborne deployment device, the deployment device may be positioned above the body of water at a height such that the surface of the body of water is minimally disturbed when determining the thickness. When the deployment device utilizes a waterborne device, the speed at which the device traverses the body of water may be such that the substance to be determined on the body of water is minimally disturbed or consistently displaced such that a relative determination of thickness may be obtained and/or an algorithm may account for the displacement due to movement.

In one or more embodiments, additional thickness determination techniques may be utilized in combination with the thickness detection apparatus. For example, one or more additional thickness detection techniques may be initially applied to an area of interest to quickly screen for potential regions of thicker substance (e.g., using the down wash of the airborne deployment device to clear an area of the substance, recording the time to clear the area, and using a predetermined table correlating clearing times to thickness of the substance to determine the thickness and subsequent determinations made in the identified regions with the thickness detection apparatus. Additionally, the combination may include one or more additional thickness detection techniques subsequently applied to the thicker regions identified by the thickness detection apparatus to confirm and/or refine the thickness determination (e.g., extending an open-ended sample tube into the substance and having the ends closed via a remote actuating device followed by directly determining the thickness of the substance captured within the sample tube.

Once a thickness determination has been obtained, a determination is made whether the operation is complete, as shown at block 1514. If the operation is not complete, the thickness detection apparatus may be deployed to another location to determine the thickness of the substance, as shown at block 1512. However, if the operation is complete, then the thickness detection apparatuses and any deployment devices are recaptured, as shown at block 1516.

Once the detection and thickness determination stage is complete, the response stage, which includes blocks 1518 and 1520, may be performed. At block 1518, the response techniques may be performed based at least partially on the determined thickness. That is, with the thickness and the spatial distribution, the response team may be deployed to manage the release in an efficient and enhanced manner. For instance, the response team may prioritize treating the thicker regions earlier and thinner portions later to increase response efficiency. Thick slicks may be greater than 0.1 mm, 0.5 mm, 1.0 mm, 2.0 mm, or more. Once the response techniques have been performed, the response stage ends as block 1520.

Figure 16:
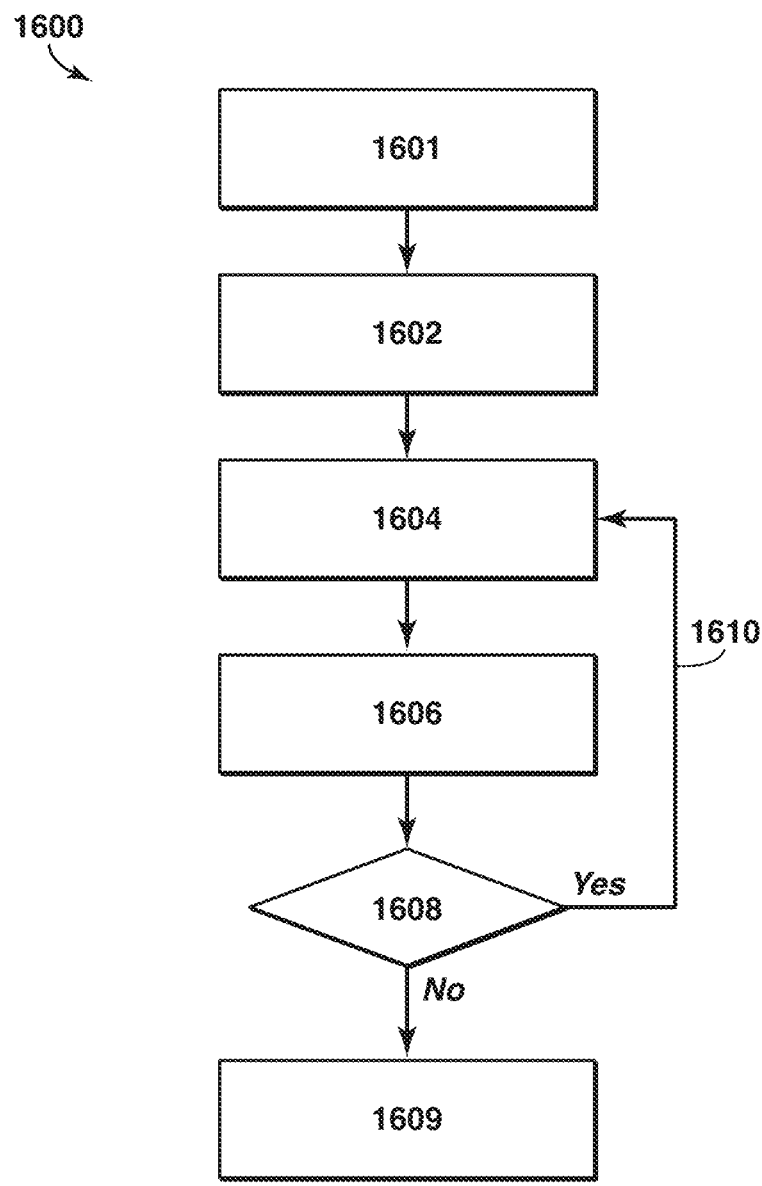
FIG. 16 is a flow chart for performing thickness determinations according to one or more embodiments of the present disclosure.

FIG. 16 is a flow chart 1600 for performing thickness determinations according to one or more embodiments of the present disclosure. A remote controlled helicopter may be used as an airborne deployment device. The helicopter may be remotely controlled by an operator on a marine response vessel that is positioned near an oil spill. This helicopter may also include high definition (HD) and infrared (IR) cameras that transmit signals of images and/or video to a command unit on the oil spill response vessel. As may be appreciated, the method may begin at block 1601 by flying the helicopter from the deck of the vessel to a position above the vessel. This initial flight may be utilized to test the communications with the helicopter. Subsequently, the helicopter may be utilized to locate the oil slick including a perimeter thereof, which may provide a spatial distribution of the oil slick. The oil slick may be identified by the HD and/or IR cameras based on either visual cues from the HD camera or infrared cues from the IR camera. It is known by those practiced in the art that oil slicks on a water surface tend to have different temperatures than the water surface itself. These temperature differences are readily detectable via an infrared (IR) camera.

At block 1601, a thickness detection apparatus including a thickness detection camera is attached to a retractable line on the helicopter. The thickness detection camera is set up in a configuration to photograph an image or a video of a profile of at least the air-substance interface, for example the air-substance-water interfaces.

The process begins by flying the helicopter to a point where it is above the desired location of the oil slick, as shown at block 1602. The height above the oil slick may be at least two times the diameter of the rotor of the propulsion system of the helicopter, for example at least three times or at least 4 times, same basis, to minimize the disturbance of the oil slick by the helicopter. At block 1604, the thickness detection apparatus is lowered until it is at least partly passing through the oil slick, such that the thickness detection camera may capture at least the air-oil interface, for example the air-oil-water interfaces. The thickness detection apparatus may collect images of the single location or may be moved through the body of water by the helicopter along a given path. The path may be a predetermined pattern or may be determined based on the information being collected. The predetermined pattern may be based on prevailing oceanographic conditions and/or prior information collected, for example from a spotter helicopter or from an initial thickness determination technique as discussed herein. Upon completion of collecting the images or video, the thickness detection apparatus is recovered using the retractable tethering line. Once the camera image has been obtained, the image may be used to determine the oil slick thickness, as shown at block 1606. At block 1608, the oil slick location and the oil slick thickness determination are recorded. This record may be stored in memory in the command unit and/or a module associated with the helicopter. The location and thickness determination may be visually displayed on a monitor. If additional thickness determinations are desired, the process returns to block 1604 via 1610. If no additional thickness determinations are desired, the method ends at block 1609.

Figure 17:
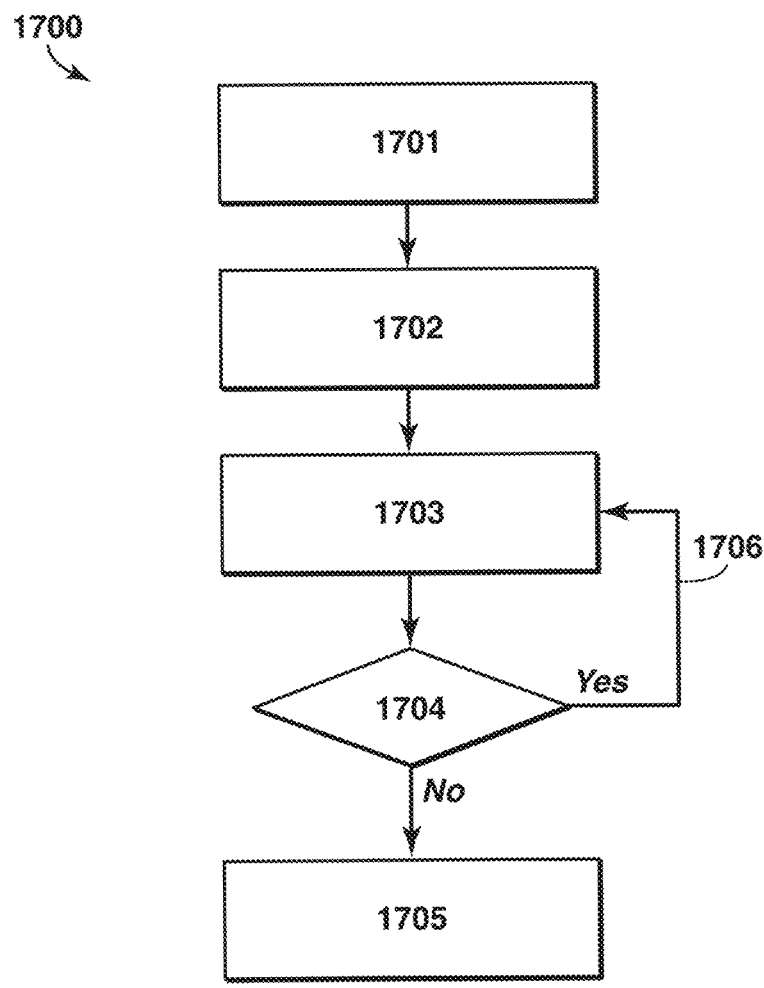
FIG. 17 is a flow chart for determining the volume of a substance released into a body of water according to one or more embodiments of the present disclosure.

FIG. 17 is a flow chart 1700 for determining the volume of a substance released into a body of water according to one or more embodiments of the present disclosure. The method begins at block 1701. At block 1702, one or more thickness detection apparatuses according to one or more embodiments of the present disclosure are deployed to an area of interest in the body of water. At block 1703, one or more thicknesses are determined within the area of interest as well as the area occupied by the substance. At block 1704, the volume of the substance released within the area of interest is determined based on the thickness of and the area occupied by the substance from block 1703. Additional thicknesses in the particular area of interest or in a different area of interest may be desired in which case the process would return to block 1703 via 1706 and the volume determination adjusted accordingly. If no additional thicknesses are desired, the method ends at block 1705.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A method for determining a thickness of a substance on a surface of a body of water comprising:
   positioning at least one thickness detection apparatus in the body of water, the thickness detection apparatus comprising:
      a body having a plurality of sides, wherein at least a portion of at least one of the plurality of sides comprises a light transmitting material, and
      at least one camera disposed within the body and configured to generate at least one image through the light transmitting material of the substance extending a depth below an air-substance interface; and
   analyzing at least one image from the camera to determine the thickness of the substance on the body of water.

2. The method of claim 1, wherein the analyzing includes comparing the thickness of the substance in a region within the image to a reference length to determine the thickness of the substance on the body of water.

3. The method of claim 1, wherein the analyzing includes comparing the thickness of the substance in a plurality of images to determine the thickest region or regions of the substance within the area of interest.

4. The method of claim 1, further comprising moving the thickness detection apparatus through the water in a continuous manner.

5. The method of claim 4, wherein two sides of the plurality of sides form a bow of the thickness detection apparatus and the bow leads the movement through the water.

6. The method of claim 1, wherein the at least one camera is configured to move with at least three degrees of freedom.

7. The method of claim 1, further comprising stabilizing the thickness detection apparatus using a stability enhancing system comprising a horizontal support (160), a plurality of vertical supports (165), a first ski (150) positioned on a port side of the system, and a second ski (155) positioned on a starboard side of the system, such that the vertical supports (165) operatively connect the horizontal support (160) to the respective first ski (150) and second ski (155).

8. The method of claim 7, wherein the stability enhancing system comprises a drogue operatively connected to the body.

9. The method of claim 8, further comprising a weight integral with a bottom of the body or underneath the body.

10. The method of claim 7, wherein the stability enhancing system comprises a plurality of skis operatively connected to the body.

11. The method of claim 1, wherein the camera is configured to provide a real-time video to an operator.

12. The method of claim 1, further comprising moving the thickness detection apparatus through the water using a propulsion system in the thickness detection apparatus.

13. The method of claim 1, further comprising moving the thickness detection apparatus through the water using a deployment device selected from the group consisting of a manned airborne device, an unmanned airborne device, a manned waterborne device, an unmanned waterborne device, and combinations thereof.

14. The method of claim 13, further comprising obtaining at least one additional image using at least one additional camera disposed on the deployment device.

15. The method of claim 1, further comprising obtaining at least one additional image using at least one additional camera disposed on the exterior of the thickness detection apparatus.

16. The method of claim 1, wherein the plurality of sides of the body of the thickness detection apparatus forms a hull of a waterborne device.

17. The method of claim 1, wherein the volume of the body of the thickness detection apparatus is at least five times greater than the volume of the thickness detection camera.

18. An apparatus for determining a thickness of a substance on a surface of a body of water comprising:
   a body having a plurality of sides, wherein at least a portion of at least one of the plurality of sides comprises a light transmitting material;
   at least one camera disposed within the body of the thickness detection apparatus and configured to generate at least one image through the light transmitting material of the substance extending a depth below an air-substance interface; and
   a stability enhancing system comprising a horizontal support (160), a plurality of vertical supports (165), a first ski (150) positioned on a port side of the system, and a second ski (155) positioned on a starboard side of the system, such that the vertical supports (165) operatively connect the horizontal support (160) to the respective first ski (150) and second ski (155).

19. The apparatus of claim 18, wherein the volume of the body of the thickness detection apparatus is at least five times greater than the volume of the thickness detection camera.

20. The apparatus of claim 18, wherein the light transmitting material is a transparent material positioned in a forward section of the body of the thickness detection apparatus.

21. The apparatus of claim 18, wherein two sides of the plurality of sides form a bow of the thickness detection apparatus.

22. The apparatus of claim 18, wherein the at least one camera is configured to move with at least three degrees of freedom.

23. The apparatus of claim 18, wherein the camera is configured to provide a real-time video to an operator.

24. The apparatus of claim 18, further comprising at least one additional camera disposed on the exterior of the thickness detection apparatus.

25. The apparatus of claim 18, wherein the plurality of sides of the body of the thickness detection apparatus forms a hull of a waterborne device.

26. A method of determining a volume of a substance released into a body of water comprising:
   deploying a thickness detection apparatus to an area of interest in the body of water, the thickness detection apparatus comprising:
      a body having a plurality of sides, wherein at least a portion of at least one of the plurality of sides comprises a light transmitting material, and
      at least one camera disposed within the body and configured to generate at least one image of the substance extending a depth below an air-substance interface through the light transmitting material;

analyzing at least one image from the camera to determine one or more thicknesses of the substance within the area of interest; and determining the volume of the substance released based on the determined thicknesses of the substance within the area of interest.

* * * * *